(12) United States Patent
Maeda et al.

(10) Patent No.: US 6,297,182 B1
(45) Date of Patent: *Oct. 2, 2001

(54) GLASS FOR A SUBSTRATE

(75) Inventors: Kei Maeda; Seiki Ohara; Tetsuya Nakashima; Yasumasa Nakao, all of Kanagawa (JP)

(73) Assignee: Asahi Glass Company Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/358,421

(22) Filed: Jul. 22, 1999

(30) Foreign Application Priority Data

Aug. 11, 1998 (JP) .................................................. 10-227304
Oct. 29, 1998 (JP) .................................................. 10-308981

(51) Int. Cl.$^7$ ............................ C03C 3/091; C03C 3/093
(52) U.S. Cl. ................................. 501/66; 501/67; 501/70; 501/72
(58) Field of Search ................................. 501/66, 67, 70, 501/72

(56) References Cited

U.S. PATENT DOCUMENTS

| 3,013,888 | * | 12/1961 | de Lajarte . | |
|---|---|---|---|---|
| 3,523,803 | * | 8/1970 | Haslay et al. . | |
| 4,390,636 | * | 6/1983 | Votova | 501/24 |
| 5,459,109 | | 10/1995 | Lapp . | |
| 5,599,754 | | 2/1997 | Maeda et al. . | |
| 5,631,195 | | 5/1997 | Yanagisawa et al. . | |
| 5,776,844 | | 7/1998 | Koch et al. . | |
| 5,780,371 | * | 7/1998 | Rifqi et al. | 501/67 |
| 5,780,373 | | 7/1998 | Yanagisawa et al. . | |
| 5,854,153 | * | 12/1998 | Kohli | 501/70 |
| 5,858,897 | | 1/1999 | Maeda et al. . | |
| 5,888,917 | | 3/1999 | Kawaguchi et al. . | |
| 5,908,794 | | 6/1999 | Maeda et al. . | |
| 6,063,718 | * | 5/2000 | Khiati et al. | 501/70 |

FOREIGN PATENT DOCUMENTS

| 0 850 891 | | 7/1998 | (EP) . |
|---|---|---|---|
| 0 853 070 | | 7/1998 | (EP) . |
| 2 317 611 | | 4/1998 | (GB) . |
| 3-2515 | * | 1/1978 | (JP) . |
| 3-040933 | | 2/1991 | (JP) . |
| 7-257937 | | 10/1995 | (JP) . |
| 9-202641 | | 8/1997 | (JP) . |
| 09-09255355 | * | 9/1997 | (JP) . |
| 9-249430 | | 9/1997 | (JP) . |
| 9-255354 | | 9/1997 | (JP) . |
| 9-255355 | | 9/1997 | (JP) . |
| 9-255356 | | 9/1997 | (JP) . |
| 9-301732 | | 11/1997 | (JP) . |
| 10-025128 | | 1/1998 | (JP) . |
| 10-025129 | | 1/1998 | (JP) . |
| 10-025130 | | 1/1998 | (JP) . |
| 10-040820 | | 2/1998 | (JP) . |
| 10-045423 | | 2/1998 | (JP) . |
| 667515 | * | 6/1979 | (SU) . |
| WO 98/49111 | | 11/1998 | (WO) . |

OTHER PUBLICATIONS

Callister, Materials Science and Engineering, pp. 303–304, 1985.*
Derwent Abstracts, Accession No. 98–379013/199833, EP 854117 Jul. 1998.
S. T. Gulati, et al. P–30: "Mechanical Reliability of AMLCD Glass Substrates", SID 96 Digest, 1996, pp. 518–521 (No Month).
S. M. Wiederhorn. "Fracture Surface Energy of Glass", Journal of the American Ceramic Society, vol. 52 No. 2, Feb. 1969, pp. 99–105.
R.J. Eagan, et al. "Effect of Composition on the Mechanical Properties of Aluminosilicate and Borosilicate Glasses", Journal of the American Ceramic Society, vol. 61 No. 1–2, Jan.–Feb. 1978, pp. 27–30.

* cited by examiner

*Primary Examiner*—David R Sample
(74) *Attorney, Agent, or Firm*—Oblon, Spivak, McClelland, Maier & Neustadt, P.C.

(57) ABSTRACT

A glass for a substrate consisting essentially of:

| | |
|---|---|
| $SiO_2$ | 45 to 65 wt %, |
| $Al_2O_3$ | 6 to 20 wt %, |
| $B_2O_3$ | 0.5 to 6 wt %, |
| MgO | 2 to 5 wt %, |
| CaO | 1 to 10 wt %, |
| SrO | 0 to 6.5 wt %, |
| BaO | 0 to 2 wt %, |
| MgO + CaO + SrO + BaO | 10 to 17 wt %, |
| $ZrO_2$ | 0 to 7 wt %, and |
| $Na_2O + K_2O$ | 7 to 15 wt %. |

4 Claims, No Drawings

GLASS FOR A SUBSTRATE

BACKGROUND OF THE INVENTION

1. Field of the Invention

The present invention relates to a glass for a substrate having high resistance against progress of fracture i.e. a glass for a substrate having high fracture toughness.

2. Discussion of Background

In recent years, large sized flat display panels represented by color plasma display panels (hereinafter referred to as color PDP) have been increasingly used, and glasses to be used as substrates thereof have been diversified. Heretofore, usual soda lime silica glass has been widely used for substrates for large sized flat display panels. One of the reasons is such that the thermal expansion coefficients of various glass frit materials to be used as constituting part materials for panels, including inorganic sealing materials, can easily be adjusted to the thermal expansion coefficient of soda lime silica glass.

On the other hand, in order to reduce deformation or thermal shrinkage of glass substrates in the heat treatment process during the production of large sized flat display panels, it is strongly desired to improve the thermal resistance of the glass for substrates. For this purpose, a so-called high strain point glass has been widely used as a substrate, which has a thermal expansion coefficient of the same level as soda lime silica glass and has a higher strain point (at least about 550° C.) and which has an alkali content controlled to be low in order to improve the electrical insulating property.

Further, a glass substrate is being practically employed as a substrate for information recording media, particularly as a substrate for magnetic discs (hard discs), since it is excellent in the surface smoothness or the mechanical strength such as impact resistance.

However, such a high strain point glass is brittle as compared with soda lime silica glass and thus has had a problem that it is likely to break in the production process. Further, such a high strain point glass has had another problem that its density is large, whereby it has been difficult to reduce the weight of the large sized flat display panel.

To solve such problems, a glass for a substrate has been proposed which has a low density and is hardly scratched, and which is suitable as a substrate for a flat panel display (JP-A-9-301733). The characteristic of being hardly scratched is effective in a case where a flaw as a fracture origin is likely to be imparted in the process for producing a panel, but it is not necessarily effective in a case where a flaw is imparted during processing treatment such as cutting prior to such a production process. It is usual that many flaws which are likely to be fracture origins, are already present at an edge portion of the glass in the processing treatment such as cutting.

Further, also in such a case where glass is employed as a substrate for magnetic discs, many processing treatments are required such as circular processing, center cut, inner and outer peripheral edge chamfering, etc. During such processing treatments, many flaws which are likely to be fracture origins, will be formed along the edge, etc., of the glass, and there has been a problem that not only during the production process, but also during the use of magnetic discs, the glass is likely to break from such flaws as fracture origins. Recently, it has been desired to increase the speed of rotation of discs in order to improve the read/write speed, and especially in such a case, the problem of fracture of glass becomes more serious.

In such a case, in order to prevent fracture of the glass, it has been necessary to present a glass for a substrate which essentially has high resistance against the progress of fracture due to a tensile stress, i.e. a glass for a substrate having high fracture toughness.

SUMMARY OF THE INVENTION

It is an object of the present invention to solve the above problems and to provide a glass for a substrate which has a high glass transition point and a thermal expansion coefficient being substantially equal to soda lime silica glass and which has high resistance against the progress of fracture i.e. high fracture toughness and scarcely fractures during the production process or during the use.

The present invention provides a glass for a substrate consisting essentially of:

| | |
|---|---|
| $SiO_2$ | 45 to 65 wt %, |
| $Al_2O_3$ | 6 to 20 wt %, |
| $B_2O_3$ | 0.5 to 6 wt %, |
| MgO | 2 to 5 wt %, |
| CaO | 1 to 10 wt %, |
| SrO | 0 to 6.5 wt %, |
| BaO | 0 to 2 wt %, |
| MgO + CaO + SrO + BaO | 10 to 17 wt %, |
| $ZrO_2$ | 0 to 7 wt %, and |
| $Na_2O + K_2O$ | 7 to 15 wt %. |

DETAILED DESCRIPTION OF THE PREFERRED EMBODIMENTS

Now, the present invention will be described in detail with reference to the preferred embodiments.

In the present invention, the glass for a substrate is a glass to be used for a substrate for an information recording medium such as a magnetic disc, or for a substrate for a flat panel display such as color PDP, plasma address liquid crystal (PALC) or field emission display (FED).

The glass for a substrate of the present invention is suitable for float forming.

The glass for a substrate of the present invention preferably consists essentially of:

| | |
|---|---|
| $SiO_2$ | 45 to 65 wt %, |
| $Al_2O_3$ | 10 to 20 wt %, |
| $B_2O_3$ | 1 to 6 wt %, |
| MgO | 2 to 5 wt %, |
| CaO | 1 to 10 wt %, |
| SrO | 0 to 4.5 wt %, |
| BaO | 0 to 2 wt %, |
| MgO + CaO + SrO + BaO | 10 to 17 wt %, |
| $ZrO_2$ | 0 to 5 wt %, and |
| $Na_2O + K_2O$ | 7 to 15 wt %. |

In the present invention, the reasons for defining the composition are as follows. (In the following, "%" means "wt %" unless otherwise specified.) $SiO_2$ is essential as a network former. If it exceeds 65%, the average thermal expansion coefficient from 50 to 350° C. (hereinafter referred to simply as the thermal expansion coefficient) tends to be too small. It is preferably at most 59%, more preferably at most 55%, particularly preferably at most 54%. If it is less than 45%, the heat resistance and chemical durability tend to deteriorate. It is preferably at least 50%.

$Al_2O_3$ is an essential component and is effective to increase the glass transition point and to increase the heat resistance. If it exceeds 20%, the thermal expansion coefficient tends to be too small, and the viscosity of the molten glass tends to be too high to carry out float forming. It is preferably at most 16%. If it is less than 6%, the above-mentioned effects tend to be small. It is preferably at least 10%, more preferably at least 12%.

Further, in a case where the glass for a substrate of the present invention is melted in a glass melting furnace wherein an AZS (Al hd $2O_3$—$ZrO_2$—$SiO_2$) type electrocast brick is used at a portion which will be in contact directly with molten glass, $Al_2O_3$ is preferably from 6 to less than 10%. If it is 10% or more, the corrosiveness of molten glass against the AZS type electrocast brick tends to be substantial.

$B_2O_3$ is an essential component and is effective to increase the fracture toughness and to lower the viscosity of the molten glass at the time of melting the glass. If it exceeds 6%, the thermal expansion coefficient tends to be too small, or vaporization of $B_2O_3$ at the time of melting the glass tends to be too much. It is preferably at most 5%. If it is less than 0.5%, the above effects tend to be small. It is preferably at least 1%, more preferably at least 2%. In order to increase the above effects, it is preferably from 2.6 to 5%. Further, in order to prevent a damage to the material of the glass melting furnace by evaporated $B_2O_3$, it is preferably from 0.5 to 2.5%, more preferably from 0.5 and less than 1%.

MgO is an essential component and is effective to increase the fracture toughness and to reduce the viscosity of the molten glass at the time of melting the glass. If it exceeds 5%, the glass tends to be unstable. It is preferably at most 4%. If it is less than 2%, the above effects tend to be small. It is preferably at least 3%.

CaO is an essential component and is effective to increase the thermal expansion coefficient and to lower the viscosity of the molten glass at the time of melting the glass. If it exceeds 10%, the glass tends to be unstable. It is preferably at most 9%. If it is less than 1%, the above effects tend to be small. It is preferably at least 5%, more preferably at least 6%.

SrO is not essential, but is effective to increase the thermal expansion coefficient and to lower the viscosity of the molten glass at the time of melting the glass. It may be added up to 6.5%. If it exceeds 6.5%, the specific gravity tends to be too high. It is preferably at most 4.5%, more preferably at most 4%, most preferably at most 3%.

BaO is not essential, but is effective to increase the thermal expansion coefficient and to lower the viscosity of the molten glass at the time of melting the glass. It may be added up to 2%. If it exceeds 2%, the specific gravity tends to be too high. It is preferably at most 1%.

The total amount of Sro and Bao is preferably at most 7%. If it exceeds 7%, the specific gravity tends to be too high. It is more preferably at most 6%, most preferably at most 5%.

The total amount of MgO, CaO, SrO and BaO is from 10 to 17%. If it exceeds 17%, the glass tends to be unstable. It is preferably at most 15%. If it is less than 10%, the viscosity of the molten glass at the time of melting the glass, tends to be too high. It is preferably at most 12%.

$ZrO_2$ is not essential, but may be incorporated up to 7% to increase the fracture toughness, to increase the glass transition point, or to improve the alkali resistance. If it exceeds 7%, the glass tends to be unstable, and the glass tends to be scratchable. It is preferably at most 5%, more preferably at most 4%. Further, when cleaning of the glass substrate is carried out by means of an alkaline cleaning liquid, $ZrO_2$ is preferably more than 5% and at most 7%.

$Na_2O$ and $K_2O$ are components which are effective to increase the thermal expansion coefficient and to lower the viscosity of the molten glass at the time of melting the glass, and their total amount is from 7 to 15%. If the total amount exceeds 15%, the chemical durability and electrical insulating property tend to deteriorate. It is preferably at most 13%. If it is less than 7%, the above-mentioned effects tend to be small. It is preferably at least 9%.

$Na_2O$ is preferably from 1 to 10%. If it exceeds 10%, the electrical insulating property tends to deteriorate. It is more preferably at most 7%, most preferably at most 6%. If it is less than 1%, the mixed alkali effect (improvement of the electrical insulating property) by the coexistence with $K_2O$, tends to be small, or the viscosity of the molten glass at the time of melting the glass, tends to be high.

$K_2O$ is preferably from 5 to 14%. If it exceeds 14%, the electrical insulating property tends to deteriorate. If it is less than 5%, the thermal expansion coefficient tends to be small, or the glass transition point tends to be low. It is preferably at least 7%.

In addition to the above components, a refining agent such as $SO_3$, $As_2O_3$ or $Sb_2O_3$, or a coloring agent such as $Fe_2O_3$, NiO or CoO, may optionally be incorporated to the glass of the present invention. Further, to prevent browning due to e.g. electron rays, $TiO_2$ and $CeO_2$ may be incorporated in an amount of at most 2% each or in a total amount of at most 2%.

Further, to improve the meltability, ZnO may be incorporated, but if it is incorporated in an amount of 5% or more, it is likely to be reduced in a float bath for float forming to bring about defects.

Further, to obtain the same effects as $Na_2O$ and $K_2O$, $Li_2O$ may be incorporated. However, an excessive incorporation is likely to lower the glass transition point, and $Li_2O$ is preferably at most 2%.

The fracture toughness of the glass of the present invention is preferably at least 0.70 $MPa \cdot m^{1/2}$ to make the glass hardly breakable during the production process or during the use.

The specific gravity of the glass of the present invention is preferably less than 2.65, more preferably less than 2.6, to satisfy the desirability for light weight.

The glass transition point of the glass of the present invention is preferably at least 600° C. to make the glass substrate hardly susceptible to thermal deformation or thermal shrinkage. This corresponds to a strain point of at least 550° C.

The thermal expansion coefficient of the glass of the present invention is preferably from $75 \times 10^{-7}$ to $95 \times 10^{-7}$/°C., more preferably from $80 \times 10^{-7}$ to $90 \times 10^{-7}$/°C., i.e. substantially the same as soda lime silica glass.

A glass substrate made of the glass for a substrate of the present invention, can be prepared, for example, by the following method. Namely, starting materials of the respective components, which are commonly used, are mixed to have a desired composition, and the batch is continuously introduced into a melting furnace and heated and melted at from 1,500 to 1,650° C. This molten glass is formed to have a predetermined thickness by a float method, annealed and cut to obtain a transparent glass substrate.

Now, the present invention will be described in further detail with reference to Examples. However, it should be understood that the present invention is by no means restricted to such specific Examples.

EXAMPLES

Starting materials were mixed to have a composition shown by wt % in the upper section of Table 1, and the batch was put into a platinum crucible, heated to 1,550 to 1,650° C. and melted for from 4 to 5 hours. During the period, the melt was stirred for 2 hours by a platinum stirrer to homogenize the glass. Then, the molten glass was cast to form a sheet, followed by annealing.

In the columns of "RO total amount" and "$M_2O$ total amount" in Table 1, the total amount of MgO, CaO, SrO and BaO, and the total amount of $Na_2O$ and $K_2O$, are shown by wt %, respectively.

With respect to each glass obtained, the specific gravity, the fracture toughness (unit: $MPa·m^{1/2}$), the thermal expansion coefficient (unit: $10^{-7}/°C.$), the glass transition point (unit: °C.) were measured. Further, with respect of some glasses, the strain point (unit: °C.), the viscosity η in the molten state and the resistivity ρ (unit: Ω·cm) were also measured. The results of measurements are shown in Table 1. The values shown by "logη=4" and "logη=2" in Table 1, are temperatures (unit: °C.) at which the viscosity η becomes $10^4$ poise and $10^2$ poise, respectively. The former is an index for float moldability, and the latter is an index for glass meltability. Further, the values shown by "logρ" in Table 1, are common logarithm of ρ at 150° C. ρ is an index for the electrical insulating property, and log ρ is preferably at least 9.5 at 150° C.

The methods for measuring the above various properties will be shown below.

Specific gravity: Measured by an Archimedes method with respect to a glass block of about 30 g containing no bubbles.

Fracture toughness: Measured by a Chevron Notch method as disclosed in Int. J. Fracture, 16(1980) p. 137–141. Namely, a Chevron Notch was formed at the center of a test specimen having a thickness of 8 mm, a width of 8 mm and a length of 80 mm. Using a Tensilon type strength tester, a four-point bending test was carried out at a cross head speed of 0.005 mm/min so that constant fracture occurs from the forward end of the notch in the test specimen supported with a span of 64 mm. The upper span was 16 mm. Further, in order to avoid fatigue effects of the glass due to moisture, the measurement was carried out in a dry nitrogen atmosphere.

Thermal expansion coefficient: Using a differential dilatometer, elongation of the glass was measured when the temperature was raised at a rate of 5° C./min from room temperature, using quartz glass as a reference specimen. The measurement was carried out to the temperature at which expansion will no longer be observed even if the glass is softened, i.e. to the yield point, and an average linear thermal expansion coefficient from 50 to 350° C., was calculated.

Strain point: Measured by a method prescribed in JIS R3103.

Glass transition point: A temperature corresponding to the bending point in the thermal expansion curve obtained by the measurement of the above thermal expansion coefficient, was read out and taken as the glass transition point.

Viscosity in the molten state: Measured by a rotary cylinder method.

Resistivity: Measured by the method prescribed in ASTM C657.

As is evident from Table 1, glasses of Examples 1 to 13 which are Examples of the present invention, have fracture toughness of at least 0.70 $MPa·m^{1/2}$, and the resistance against the progress of fracture is high. Further, the specific gravity is also less than 2.65, whereby reduction of the weight of the glass substrate is easy. On the other hand, glasses of Examples 14 and 15 which are Comparative Examples, are glasses known as a substrate for color PDP and a substrate for a magnetic disc, respectively, but the fracture toughness is less than 0.70 $MPa·m^{1/2}$, and the resistance against the progress of fracture is low, whereby the probability of breakage during the production process or during the use, is high.

TABLE 1

| | Example No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| $SiO_2$ | 53.0 | 52.4 | 52.5 | 51.6 | 51.7 | 51.4 | 51.4 | 62.7 | 59.5 | 59.2 | 53.3 | 55.4 | 58.3 | 58.0 | 63.0 |
| $Al_2O_3$ | 17.3 | 18.8 | 14.8 | 13.9 | 14.6 | 15.0 | 11.0 | 11.3 | 11.0 | 13.1 | 8.5 | 7.8 | 12.0 | 14.0 |
| $B_2O_3$ | 4.3 | 4.3 | 4.3 | 4.2 | 4.2 | 4.7 | 4.4 | 2.6 | 4.7 | 5.0 | 4.3 | 4.4 | 1.1 | 0 | 0 |
| MgO | 4.1 | 3.7 | 4.0 | 4.0 | 4.0 | 3.6 | 3.6 | 4.5 | 3.4 | 4.5 | 3.2 | 3.7 | 3.7 | 2.0 | 0 |
| CaO | 9.5 | 9.0 | 9.4 | 8.5 | 8.0 | 7.6 | 8.0 | 6.0 | 5.5 | 2.0 | 8.0 | 8.1 | 5.9 | 5.0 | 0 |
| SrO | 0 | 0 | 0 | 1.6 | 2.3 | 3.1 | 2.3 | 0 | 2.4 | 4.0 | 2.8 | 3.1 | 5.5 | 2.0 | 0 |
| BaO | 0 | 0 | 0 | 0 | 0 | 0 | 0 | 0 | 0 | 0 | 0 | 0 | 0 | 6.0 | 0 |
| RO total amount | 13.6 | 12.7 | 13.5 | 14.0 | 14.3 | 14.3 | 14.0 | 10.5 | 11.3 | 10.5 | 14.0 | 14.9 | 15.1 | 15.0 | 0 |
| $ZrO_2$ | 0 | 0 | 2.8 | 3.7 | 2.8 | 2.8 | 2.8 | 0 | 0 | 0 | 2.8 | 3.7 | 5.4 | 2.0 | 7.0 |
| $Na_2O$ | 6.7 | 6.7 | 5.7 | 4.7 | 4.9 | 4.9 | 4.7 | 5.8 | 5.7 | 6.8 | 4.7 | 2..4 | 6.6 | 4.5 | 10.0 |
| $K_2O$ | 5.1 | 5.1 | 6.5 | 7.8 | 7.5 | 7.4 | 7.8 | 7.4 | 7.5 | 7.5 | 7.8 | 10.7 | 5.7 | 8.5 | 0 |
| $M_2O$ total amount | 11.8 | 11.7 | 12.2 | 12.5 | 12.4 | 12.3 | 12.4 | 13.2 | 13.2 | 14.3 | 12.5 | 13.1 | 12.3 | 13.0 | 10.0 |
| $Li_2O$ | 0 | 0 | 0 | 0 | 0 | 0 | 0 | 0 | 0 | 0 | 0 | 0 | 0 | 0 | 6.0 |
| Specific gravity | 2.53 | 2.53 | 2.57 | 2.59 | 2.59 | 2.60 | 2.59 | 2.48 | 2.50 | 2.50 | 2.59 | 2.59 | 2.64 | 2.63 | 2.52 |
| Fracture toughness | 0.71 | 0.72 | 0.80 | 0.78 | 0.77 | 0.77 | 0.76 | 0.71 | 0.72 | 0.73 | 0.75 | 0.75 | 0.76 | 0.64 | 0.68 |
| Thermal expansion coefficient | 84 | 81 | 84 | 85 | 84 | 81 | 84 | 78 | 80 | 82 | 83 | 83 | 83 | 84 | 90 |
| Strain point | | 589 | | 590 | 588 | | | 589 | 462 | | | | | | |
| Glass transition point | 632 | 637 | 632 | 632 | 632 | 631 | 635 | 638 | 620 | 608 | 629 | 628 | 631 | 649 | 500 |
| log η = 4 | 1114 | 1135 | 1101 | 1100 | 1113 | 1118 | 1127 | 1170 | 1145 | 1142 | 1123 | 1116 | 1125 | | |
| log η = 2 | 1507 | 1535 | 1490 | 1489 | 1507 | 1517 | 1521 | 1615 | 1605 | 1615 | 1509 | 1518 | 1543 | | |
| log ρ | | 9.7 | 9.9 | 10.5 | 10.3 | | 10.4 | | | | | 10.2 | | | |

According to the present invention, it is possible to provide a glass substrate which has a thermal expansion coefficient of a level equal to soda lime silica glass and which is light in weight, has a high strain point and has high fracture toughness.

By using this glass substrate for a flat display panel, it is possible to obtain effects such that fracture of the glass during the production of flat display panels can be reduced, the thermal deformation or shrinkage of the glass substrate will be reduced, adjustment to the thermal expansion coefficient of the glass frit material to be used as a part material constituting the panel, can be facilitated, and the weight of the panel can be reduced. Further, by using this glass substrate for a magnetic disc, fracture of the glass during the production or the use can be reduced, and adjustment to the thermal expansion coefficient of the fixing member made of metal can be facilitated.

Further, the thermal treatment temperature for the magnetic layer (the magnetic recording layer) can be increased, whereby the magnetic coercive force of the magnetic layer can be made high, and a high recording density of the magnetic recording medium can be made possible.

What is claimed is:

1. A glass for a substrate consisting essentially of:

$SiO_2$ 45 to 65 wt %, $Al_2O_3$ 6 to 20 wt %, $B_2O_3$ 1.0 to 6 wt %,

MgO 2 to 5 wt %,

CaO 1 to 10 wt %,

SrO 0 to 6.5 wt %,

BaO 0 to 2 wt %, MgO+CaO+SrO+BaO 10 to 17 wt %, $ZrO_2$ 0 to 7 wt %, and $Na_2O+K_2O$ 7 to 13.2 wt %, having a glass transition point of at least 600° C., and having a specific gravity of less than 2.65.

2. The glass for a substrate according to claim 1, which has a fracture toughness of at least 0.70 MPa·m$^{1/2}$.

3. The glass for a substrate according to claim 1, which has an average thermal expansion coefficient from 50 to 350° C. of from $75 \times 10^{-7}$ to $95 \times 10^{-7}$/°C.

4. The glass for a substrate according to claim 1, wherein the amount of $Al_2O_3$ is at least 7.8 wt %.

* * * * *